(12) United States Patent
Goodrich et al.

(10) Patent No.: US 8,682,509 B2
(45) Date of Patent: Mar. 25, 2014

(54) VEHICLE MONITORING SYSTEM

(75) Inventors: Jeffrey A. Goodrich, San Diego, CA (US); Robert H. Luppold, West Newton, PA (US); Tom Brotherton, Poway, CA (US); Paul Grabill, San Diego, CA (US)

(73) Assignee: Honeywell International Inc., Morristown, NJ (US)

( * ) Notice: Subject to any disclaimer, the term of this patent is extended or adjusted under 35 U.S.C. 154(b) by 763 days.

(21) Appl. No.: 12/526,431

(22) PCT Filed: Feb. 15, 2008

(86) PCT No.: PCT/US2008/054096
§ 371 (c)(1),
(2), (4) Date: Nov. 10, 2010

(87) PCT Pub. No.: WO2008/101167
PCT Pub. Date: Aug. 21, 2008

(65) Prior Publication Data
US 2011/0054721 A1    Mar. 3, 2011

Related U.S. Application Data

(60) Provisional application No. 60/890,386, filed on Feb. 16, 2007.

(51) Int. Cl.
*G06F 19/00* (2011.01)

(52) U.S. Cl.
USPC .................................. 701/14; 703/6; 340/10.1

(58) Field of Classification Search
USPC .................................. 701/14; 703/6; 340/10.1
See application file for complete search history.

(56) References Cited

U.S. PATENT DOCUMENTS

| | | |
|---|---|---|
| 6,173,159 B1 | 1/2001 | Wright et al. |
| 6,308,045 B1 * | 10/2001 | Wright et al. ............... 455/431 |
| 6,341,248 B1 | 1/2002 | Johnson |
| 6,556,902 B2 | 4/2003 | Ing et al. |
| 6,560,494 B1 * | 5/2003 | Soto et al. .................... 700/73 |
| 6,651,012 B1 | 11/2003 | Bechhoefer |
| 6,799,094 B1 * | 9/2004 | Vaida et al. ................... 701/3 |
| 7,152,151 B2 * | 12/2006 | Smith ............................ 712/35 |
| 7,203,630 B2 * | 4/2007 | Kolb et al. ..................... 703/6 |
| 7,573,396 B2 | 8/2009 | Stokes |
| 7,714,702 B2 | 5/2010 | Khuzadi |

(Continued)

FOREIGN PATENT DOCUMENTS

| | | |
|---|---|---|
| EP | 0407179 A1 | 1/1991 |
| WO | 0007126 A1 | 2/2000 |

OTHER PUBLICATIONS

USPTO Office Action for U.S. Appl. No. 12/615,974 dated Aug. 2, 2012.

(Continued)

*Primary Examiner* — Tuan C. To
(74) *Attorney, Agent, or Firm* — Ingrassia Fisher & Lorenz, P.C.

(57) ABSTRACT

A system to monitor aircraft equipment, having a chassis, defining an interior compartment, an arrangement configured to accept input data of at least one aircraft parameter, the arrangement configured to be placed within an aircraft, crash survivable cockpit voice and flight data recorder, and a power supply arrangement connected to arrangement configured to accept input data and the recorder.

33 Claims, 7 Drawing Sheets

(56) References Cited

U.S. PATENT DOCUMENTS

| | | | |
|---|---|---|---|
| 7,719,416 B2* | 5/2010 | Arms et al. | 340/539.1 |
| 7,789,345 B2* | 9/2010 | Matsui et al. | 244/99.4 |
| 2001/0036822 A1* | 11/2001 | Mead et al. | 455/414 |
| 2003/0065428 A1* | 4/2003 | Mendelson et al. | 701/9 |
| 2004/0176902 A1 | 9/2004 | McBrien et al. | |
| 2004/0249520 A1* | 12/2004 | Maine | 701/3 |
| 2004/0260777 A1 | 12/2004 | Kolb et al. | |
| 2005/0104771 A1 | 5/2005 | Terry et al. | |
| 2009/0012657 A1* | 1/2009 | Knotts et al. | 701/3 |
| 2011/0112775 A1* | 5/2011 | Bramban | 702/56 |

OTHER PUBLICATIONS

Levine, S.; The Remote Aircraft Flight Recorder and Advisory Telemetry System—Raft(Patent Pending) and It's Application to Unifying the Total Digital Avionics System, 0-7803-5086-3/98, 1998 IEEE.

EP Search Report, EP 08729982.2-1807 dated Feb. 22, 2013.

USPTO Office Action; U.S. Appl. No. 12/615,974, notification date Jan. 4, 2013.

EP Search Report, EP 08 729 982.2 dated Sep. 19, 2013.

\* cited by examiner

VEHICLE MONITORING SYSTEM

CROSS-REFERENCE TO RELATED APPLICATIONS

The present invention claims priority to U.S. Patent Application 60/890,386 filed Feb. 16, 2007, the entirety of which is incorporated by reference.

FIELD OF THE INVENTION

Aspects of the invention relate to monitoring systems for vehicles and aircraft. More specifically, aspects of the present invention provides a heath and usage monitoring system that will allow vehicles and aircraft to be monitored and readily updated with new setups, measurements and diagnosis for use with vehicle and aviation systems with a minimum of review by regulatory authorities.

BACKGROUND INFORMATION

The vehicle and aviation communities are attempting to achieve improved safety and reduced operating costs through various initiatives. Health and Usage Monitoring Systems (HUMS) monitor the drive train and other vehicle and aircraft component's health using specialized measurements and diagnostics. The Federal Aviation Authority (FAA) recognizes the value of HUMS and believes that component faults account for approximately 20% of accidents. The FAA believes the remainder of accidents are the result of pilot error. The Department of Defense (DOD) and large commercial operators are trying to address pilot error with programs Military Flight Operations Quality Assurance (MFOQA) and Helicopter Operations Monitoring Programs (HOMP). Both MFOQA and HOMP require the accurate measurement of inertial information and aircraft operating conditions (flight regime). MFOQA and HOMP typically require a separate flight data recorder, inertial system and Health and Usage Monitoring System (HUMS). This is often very expensive and adds significant weight to the aircraft.

HUMS are applicable to a wide variety of vehicle and aircraft platforms both commercial and military. HUMS must go through extensive hardware and software testing and certification by the DOD and FAA. This certification process is very expensive and time intensive. If hardware changes are made to the on-board systems, a re-test and re-certification is required. Aircraft safety problems are dynamic and may occur at any time. HUMS are often not able to cope with these new problems due to certification issues. Advance Field Programmable Gate Array (FPGA) technologies have progressed to the stage that reconfigurable computing is possible allowing the modification through firmware upgrades without hardware recertification.

SUMMARY OF THE INVENTION

In an exemplary embodiment of the invention, a system for monitoring aircraft is presented having a chassis, defining an interior compartment, an arrangement configured to accept input data of at least one aircraft parameter, the arrangement configured to be placed within an aircraft, crash survivable cockpit voice and flight data recorder, and a power supply arrangement connected to arrangement configured to accept input data and the recorder.

In another exemplary embodiment, the system may also include an arrangement to download the input data to a flight data monitoring program either using wired or wireless communications. The system may also be configured wherein the flight data monitoring program is configured to access, analyze and act data of the at least one aircraft parameter.

In another exemplary embodiment, the system may further include at least one vibration monitoring system connected to at least one of an engine gas generator and power turbine.

In another exemplary embodiment, the system may be configured with device drivers and software to interface with a FPGA based Digital Signal Processor.

In a further exemplary embodiment, the system is configured to withstand extreme operating environments including: temperature, altitude, crash hazard shock, vibration, explosive atmosphere, low pressure, high temperature storage, low temperature storage, temperature shock, humidity, rain, fungus, salt fog, dust, sand, functional shock, bench handling shock and gunfire vibration.

In a still further exemplary embodiment, the system may be a health and usage monitoring system.

In a further exemplary embodiment, the system may include at least one Ethernet or wireless local area network connection used to interface external aircraft systems.

The system may be configured with at least one Ethernet connection used to interface with external aircraft systems.

The system may also be configured with a chassis with an interior arrangement, the interior arrangement comprising at least one VMEP-ECA Acquisition and Processing Circuit Card, Power Supply/IO Circuit Card, Connector Circuit Card, and an inertial measurement system containing MEMS sensors and a Global Positioning System (GPS).

The system may also be configured wherein the arrangement has at least one Field Programmable Gate Array.

The system may further be configured wherein the system has a fault isolation system arrangement.

The system may also be configured wherein the fault isolation system arrangement has a built in test arrangement.

In a further exemplary embodiment, the system may also include a crash survivable cockpit voice and flight data recorder.

In another exemplary embodiment of the invention, the system is configured to perform at least one of Engine Performance Monitoring, Engine Power Assurance and Engine Usage Monitoring.

In a further exemplary embodiment of the invention, the system is configured to perform at least one of Engine Performance Monitoring, Engine Power Assurance and Engine Usage Monitoring. The circuit card may be configured to perform at track at least one of Rotor Track and Balance, Drive Train Vibration Monitoring, Helicopter Operational Monitoring Program (ROMP), Engine Health and Usage Monitoring, Exceedance Monitoring and Regime Recognition.

DETAILED DESCRIPTION

Figure 1:
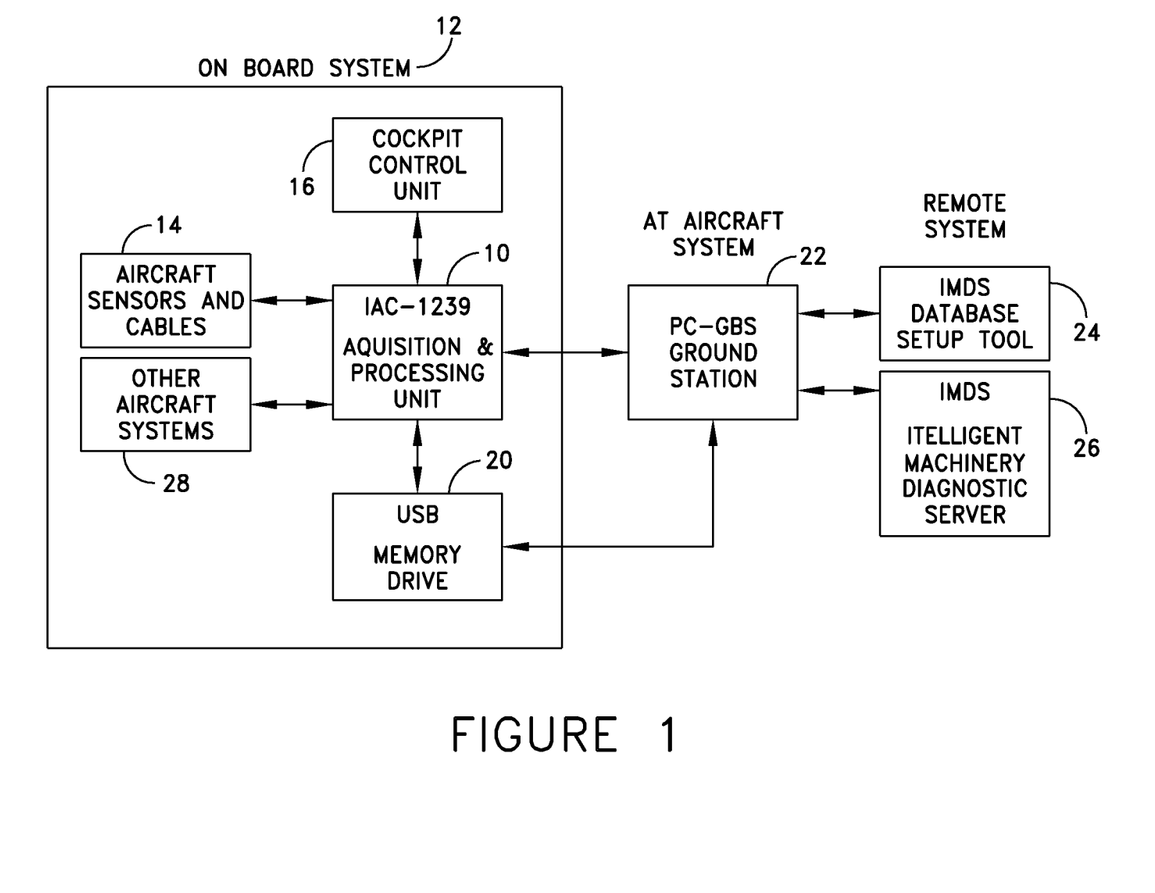
FIG. 1 is a system block diagram of an exemplary embodiment of the invention.

Aspects of the present invention employ FPGAs to implement hardware functions in re-programmable intellectual property cores (ipcores). Referring to FIG. 1, ipcores allows I/O, processing and memory management to be changed through software uploads. The system 10 uses FPGA devices that contain reconfigurable processors. This allows different levels of certified software to be partitioned using the FPGA devices. On-board systems 12 include aircraft sensors and cables 14, a cockpit control unit 16, an acquisition and processing unit 18 and USB memory drive 20. Both the acquisition and processing unit 18 and USB memory drive 20 are interconnected to a PC-GBS ground station 22 that in turn is connected to a iMDS database setup tool 24 and an iMDS Intelligent Machinery Diagnostic Server 26. Additional aircraft systems may be connected to the acquisition and processing unit 18 as needed. The above systems will be discussed in further detail below.

FPGA technology is used for Digital Signal Processing (DSP). HUMS processing involves the measurement of vibration signals from vibration transducers (accelerometers) at above audio bandwidths. Aircraft typically have between 12 and 36 accelerometers. The processing workload can overload modern general purpose and DSP processors. The FPGA technology allows functions normally performed by software executing on a general purpose or DSP processor to be embedded in the FPGA hardware. FPGA based DSP can perform equivalent algorithms running on a general purpose or DSP processor more than two orders of magnitude faster (e.g. 10 microseconds vs. 1 to 100 milli seconds). Further optimization is possible by programming intermediate data buffers, direct memory access and other speed optimization techniques. The advantage of FPGA based digital signal processing is that diagnostic loops required for aircraft or vehicle monitoring can be performed much faster compared to conventional technology wherein additional speed allows improved diagnostic coverage. System 10 weight and cost is lowered compared with traditional approaches.

Aspects of the invention provide for system design, operation and performance requirements for a three card stack VMEP-ECA based on board acquisition and processing unit hereinafter to be referred to as IAC-1239 system (FIG. 3, item) 10 and a two card stack VMEP-ECA based on board acquisition and processing unit hereinafter to be referred to as an IAC-1134. Both system have identical functions. The IAC-1134 has a reduced input output channel count. The IAC-1239 system 10 is a next-generation on board diagnostic processing unit designed to update the IAC-1209 avionics product with additional processing capability and channels. The system 10 is capable of a 10× improvement in vibration processing speed compared to conventional units, such as the IAC-1209. The system 10 provides additional processors that can be used for future DO-178B Level A/B partitioned processing. The system 10 is supportable over a ten year period by replacing IAC-1209 Commercial Off the Shelf (COTS) components with components that will be supported by their manufacturers for a period not less than ten years.

The collection and storage of HUMS and flight data is becoming a required function for many helicopter operations. The IAC-1249 system 10 adds a crash survivable cockpit voice and flight data recorder with the HUMS unit that contains the unique technologies to the IAC-1239 system 10. The IAC-1249 combined unit provides all the required functions in a single unit. The advantage is further weight and cost reduction when compared with other current system approaches.

The IAC-1239 system 10 provides an on-aircraft acquisition, processing and storage capability to support aircraft health and usage management. Specific capabilities include:

Rotor Track and Balance
Drive Train Vibration Monitoring
Helicopter Operational Monitoring Program (HOMP)
Flight Operations Quality Assurance (FOQA)
Engine Health and Usage Monitoring
Exceedance Monitoring
Regime Recognition The IAC-1239 system 10 processes vibration and parameter data in flight with the capability of lighting lights on a caution warning panel or to notify other aircraft systems through a digital interface. Selected raw and processed data are stored in non-volatile memory for transfer ground station software for further analysis and review. The IAC-1239 system 10 is capable of replacing the IAC-1209 Modern Signal Processing Unit without wiring or cable changes.

The IAC-1239 system 10 provides a generic acquisition and processing capability that can be used in place of the IAC-1209 on all current and future aircraft installations. Current applications include, for example, AH-64A/D, UH-60A/L, MH-60K, CH-47D, MH-47G, OH-58D and Bell 412. In order to accommodate required functionality such as FOQA or HOMP on future aircraft, the IAC-1239 system 10 provides an enhanced I/O and product update capability. This capability includes the ability to update the product through Field Programmable Gate Array (FPGA) firmware updates and system software updates, an internal inertial measurement circuit card and compact flash memory cards.

The major components that interact with the 1AC-1239 system 10 are the on-board system 12, PC Ground Based System 22, and Intelligent Machinery Diagnostic Server 26 (iMDS) as shown in FIG. 1.

The on-board system 12 configuration is aircraft type dependent. As a minimum, an on-board system 12 consists on an IAC-1239 acquisition and processing unit 18 and aircraft sensors and cables 14. Other optional on board systems include a Cockpit Control Unit (CCU) 16 and USB memory drive 20. Selected aircraft installations include interfaces to other aircraft systems 28 such as the Altair Smartcycle, Common Avionics Architecture System (GAAS), Cockpit Voice and Flight Data Recorder (CVR/FDR) or other aircraft system. Older aircraft may require the direct interface to analog and digital sensors. The IAC-1239 system 10 contains a flexible set of analog and digital interfaces including a Compact Flash IDE Slot (1), Accelerometer Channels (48), Tachometer Channels (10), General Purpose Analog/Discrete Inputs (48), Discrete Outputs (24), Analog Outputs (8), Blade Tracker (2), Controller Area Network (CAN), Universal Serial Bus (4), Ethernet 10/100/1000 (4), MIL-STD-1553 (4), RS-232/485 (4), Firewire (1), ARINC 429 and an internal inertial measurement system interface.

The IAC-1239 system 10 is capable of running a modified version of the On-Board Software (OBS) currently running on the IAC-1209 system. Modifications include device drivers and software modifications necessary to interface with the FPGA based Digital Signal Processor (DSP). The interface to the PC-GBS ground based software and iMDS Server 26 is retained. All aircraft setups currently running on the IAC-1209 shall execute without modification.

The IAC-1239 system 10 supports key functions as described below. The enhanced I/O interface shall support additional system functionality such as FOQA or HOMP.

The IAC-1239 system 10 automatically collects vibration and track data to support rotor track and balance calculations by the PC-GBS ground station 22. The IAC-1239 system 10 provides vibration and track measurements compatible with the Army Vibration Analyzer (AVA) system, as a non-limiting example.

Specific performance for the IAC-1239 system 10 includes recording and monitoring the vibration produced in and torque applied to the dynamic components of the air vehicle. The IAC-1239 system 10 vibration monitoring includes monitoring of the following-systems:

Rotor Systems
Transmissions
Shafts
Bearings
Engines

The IAC-1239 system 10 provides vibration monitoring of turbine engines. The vibration monitoring detects engine gas generator, power turbine and accessory components vibration related faults. The engine vibration monitoring capability is capable of being setup via a database setup so that it can be adapted to a variety of engine types without source code changes. The engine monitoring functions includes fault identification and recommended maintenance actions.

The IAC-1239 system 10 provides vibration monitoring of the aircraft drive-train for vibration related faults. The vibration monitoring incorporates fault identification and recommended maintenance actions. Diagnostics for drive train components includes Condition Indicators for a variety of components including shafts, fans, bearings, blowers and gearboxes. Each aircraft mechanical configuration is unique, therefore the IAC-1239 system 10 supports multiple aircraft types through an aircraft specific configuration capability that does not require IAC-1239 source code changes.

The IAC-1239 system 10 provides vibration monitoring of aircraft accessories such as generators, oil coolers, etc. for vibration related faults. The accessories monitoring will include fault identification and recommended maintenance actions.

The IAC-1239 system 10 supports the collection and processing of data required for FOQA or HOMP. HOMP is a FOQA for helicopters. A FOQA and HOMP uses collected data to implement a Flight Data Monitoring Program (FDM). FDM is a systematic method of accessing, analyzing and action upon information obtained from digital flight data records of routine flight operations to improve safety. FDM is a well-established practice in many fixed wing airlines and has become an essential part of airline safety management processed with proven safety and other benefits.

Applying FDM to helicopters requires the collection of specific data sets. Parameters for low, intermediate and high level implementations of a helicopter FDM program, include as non-limiting examples, A/C registration, drift angle, fuel quantity, ground speed, heading, indicated airspeed, latitude, longitude, rotor speed, normal acceleration, OAT, pitch attitude, pressure altitude, radio altitude, roll attitude, time, torque, wind angle, wind speed. The HOMP function is supported with an enhanced parameter processing capability that allows the combination of parameter data streams from multiple digital and analog sources. Provisions are retained to allow the parameter collection and storage function to be upgraded to a DO-178B Level A/B certification level by implementing partition able software a second or third processor.

External sensors and digital information and the internal inertial measurement systems can be used as inputs for the processing of derived parameters such as attitudes, speeds and headings. Where possible, the IAC-1239 system 10 supports the HOMP requirements with a minimal number of interfaces to external systems. The IAC-1239 system 10 supports contains and inertial measurement system that consist of Micro-Electro-Mechanical Systems (MEMS) sensors that provide DC Acceleration, rate gyros and magnetometer functions that can be used with GPS to produce position and attitude information. The objective is to reduce total systems cost by having an embedded HOMP capability. For digital aircraft many of the required parameters will be available over aircraft digital busses.

The IAC-1239 system 10 is capable of calculating the usage parameters, for total engine operating hours, number of engine starts, total single engine flying time, one engine inoperative time, emergency power operating minutes, aircraft usage data, number of takeoff and landing cycles, number of GAG cycles, number of rotor starts, rotor brake applications, rotor coastdowns, rotor coastdowns, rotor turning time, total regulation flight time, total ground running time, total ground running time, total in-air running time, time of first takeoff and engine shutdown, number of external load cycles for each hook, time carrying external loads for each hook, auxiliary power unit usage data as non-limiting examples. These parameters are derived from raw data provided by external data buses or parameter inputs.

The IAC-1239 engine monitoring provisions include engine performance monitoring, engine usage monitoring, and engine vibration monitoring:

Engine Performance Monitoring: The system 10 is programmed to collect one set of engine data each flight for the purpose of engine performance analysis. The system is capable of performing Health Indicator Test (HIT). The test data are acquired manually through pilot's request and automatically through flight regime recognition. The acquired data are corrected to standard atmospheric condition and normalized for trending purpose.

Engine Power Assurance Check: The system 10 is programmed to perform power assurance checks upon the pilot's command. Upon completion of power assurance check the recorder displays the available power and temperature margins. The data is recorded and trended in the ground station after downloading.

Engine Usage Monitoring: The system 10 is also programmed to compute Low Cycle Fatigue LCF damages of critical rotating components using an engine manufacturer supplied algorithm. Moreover, the system 10 is capable of performing engine run down time check as required by the engine maintenance manual. Appropriate measurements are taken to allow trending of over-all engine performance and any specific component performance necessary to support maintenance. Life usage accounting, as a minimum, includes operating time accounting, low cycle fatigue, thermal cycle, and stress rupture parameters. This capability is used to determine if the engine has exceeded operational limitations established by the manufacturer and that would reduce expected life of components or results in reduced performance or failure creating an unsafe flying condition.

The IAC-1239 system 10 is capable of processing exceedances on board. Exceedance processing is capable of using collected and calculated parameter data and vibration based Condition Indicators (CIs) to detect and annunciate on board exceedances to an external caution and warning panel light or external cockpit display. The exceedances include the ability to use parameters and CIs as single values against a limit or in logical combinations. A timed exceedance capability is provided and a parameter or combination of parameters to be in an over limit condition for a configurable period of time.

The IAC-1239 system 10 is capable of detecting aircraft flight regimes assuming suitable parameter data is available. The flight regime information is used to automatically collect vibration and exceedance data at required aircraft operating conditions. The flight regime capability is also capable of recording aircraft usage. The Regime Recognition system records time in each regime. Data from the regime recognition system is available during aircraft download.

The IAC-1239 system 10 supports a wide variety of sensors and system interfaces. These interfaces include, for example, internal compact flash IDE slot, accelerometer channels, tachometer channels, general purpose analog or discrete channel, discrete output, reference output, blade tracker, CAN, USB, Ethernet, MIL-STD-1553, RS-232/485, Fire Wire, ARINC 429, and inertial measurement sensors.

The IAC-1239 system 10 has two compact flash IDE interfaces, in one exemplary embodiment. One IDE interface houses an internal compact flash card that stores programs and data. This card is not removable from the outside without disassembling the system 10. A second removable IDE compact flash interface is also provided.

This second interface is capable of housing compact flash IDE devices such as compact flash cards that can be used for program and data storage in a removable format.

The IAC-1239 system 10 acquires up to 8 vibration channels simultaneously in an exemplary embodiment. Vibration acquisition shall include error checking for sensor and cable faults. As a minimum these checks shall include loss of signal and saturation/shorting of the signal.

Vibration measurements have the following specifications:

| | |
|---|---|
| Input Signal Bandwidth: | 1.5 Hz to 96 KHz |
| Full Scale Voltage Range: | 20 Vpp |
| Absolute Maximum Input Voltage: | 30 Volts |
| Frequency Accuracy: | ±0.5% |
| Amplitude Accuracy: | ±5% of full scale |
| Inter-channel Phase Deviation: | ±1 degree |
| Inter-channel Gain Mismatch: | 0.5 dB |
| Signal to Noise Ratio: | >100 dB |

Cross Talk Isolation: >70 dB

Vibration acquisitions can be triggered both manually and automatically. Manual acquisitions are a response to input from the front panel. Automatic acquisitions are triggered based on software such as background monitoring of critical components.

The IAC-1239 system 10 provides ten high speed tachometer inputs. Each input has a 1 Mohm or greater input impedance. Each input support tachometer speed measurements from signal inputs between 100 mV and 100V. The IAC-1239 system 10 automatically adjusts input threshold to achieve the tachometer input dynamic range. Each of the tachometer inputs supports single and dual tachometer triggers.

In the exemplary embodiment, the tachometer input signal is available for both synchronous data processing and provide a continuous period measurement out that can be used for parameter processing. Provisions are also provided that allow for future high tooth-low tooth tachometer processing.

Forty-eight general purpose analog/digital input channels are provided in the exemplary embodiment provided. All forty-eight channels support signal or differential analog/digital inputs with a signal range of ±32 Volts providing a General Purpose Input. All forty-eight channels support low level signals from thermocouples or bridge circuits. The analog/discrete input comprises three sixteen channel, 24-Bit Analog-to-Digital Converter blocks using the Texas Instruments ADS1258. The ADS1258 allows the implementation of very capable analog A-D converter section with at a low cost, size and power dissipation. The characteristics of the ADS1258 include:

24 Bits, No Missing Codes
Fixed-Channel or Automatic Channel Scan
Fixed-Channel Data Rate: 125 kSPS
Auto-Scan Data Rate: 23.7 kSPS
Single-Conversion Settled Data
16 Single-Ended or 8 Differential Inputs
Bipolar (±2.5V) Operation
Low Noise: 2.8 µVrms at 1.8 kSPS
DC Stability (typical): 0.02 µV/° C. Offset Drift, 0.4 ppm/° C. Gain Drift
Open-Sensor Detection
Conversion Control Pin
Multiplexer Output for External Signal Conditioning
On-Chip Temperature, Reference, Offset, Gain, and Supply Voltage Read back
42 mW Power Dissipation
Standby, Sleep, and Power-Down Modes
8 General-Purpose Inputs/Outputs (GPIO)
32.768 kHz Crystal Oscillator or External Clock The IAC-1239 system 10 supports de-sampling thereby allowing sample rates on parameter data as low as 0.5 Hz. Typical output sample rate range from 0.5 Hz to 8 Hz. The analog/discrete input is general purpose capable of supporting each of the input types described in the following subsections. In addition the input shall be bi-polar capable of supporting up to ±32 Volt input voltages. The input impedance is, for example, 1 Mohm for each of the analog/discrete inputs. Sensor signal input characteristics were derived from the Flight Data Acquisition and Recording System Specification ARINC 717-11. Anti-aliasing filters are provided to eliminate signal aliasing on all forty-eight input channels. The analog interfaces can be configured for a variety of measurements through software and FPGA firmware updates including:
Synchros:

| | |
|---|---|
| Range: | 0 to 360° (continuous unlimited rotation) |
| Voltage: | 11.8 VAC line to line at 26 VAC ref. |
| Reference Voltage: | 26 VAC 400 Hz nominal (30 VAC) |
| Digital Scaling: | 0° is zero count and 360° is full count plus and additional binary 1, e.g. all zeros |
| Accuracy: | ±0.17% (0.6°) |

AC Voltage Ratio 1

| | |
|---|---|
| Range: | 0 to 5 VAC in and out of phase reference to 26 VAC 400 Hz excitation nominal (30 VAC max.) |
| Digital Scaling | 5 VAC out of phase is zero count and 5 VAC in phase is full count |
| Accuracy | ±0.2% (20 mVAC, nominally) |

AC Voltage Ratio 2

| | |
|---|---|
| Range: | 0 to 26 VAC in and out of phase reference to 26 VAC 400 Hz excitation nominal (30 VAC max.) |
| Digital Scaling | 26 VAC out of phase is zero count and 5 VAC in phase is full count |
| Accuracy | +0.2% (104 mVAC, nominally) |

DC Voltage (5 VDC):

| Range: | 0 to 5 VDC |
|---|---|
| Digital Scaling: | 0 VDC is zero count and 5 VDC is full count |
| Accuracy: | ±0.2% (10 mVDC) |

DC Voltage Ratio (3-wire Input):

| Range: | 0 to 5 VDC |
|---|---|
| Digital Scaling: | 0 VDC is zero count and 5 VDC is full count |
| Accuracy: | ±0.2% (10 mVDC, nominally) |

Potentiometer (1 to 10 kohm):

| Range: | 0 to excitation voltage |
|---|---|
| Excitation: | Nominally 5 VDC from IAC-1239 |
| Digital Scaling: | 0 VDC is zero count and excitation voltage is full count |
| Accuracy: | ±0.2% (10 mV, nominally) |

Resistance (90.38 ohm 3 or 4 Wire):

| Range: | 68.27 ohm to 242.70 ohm |
|---|---|
| Digital Scaling: | 0 VDC is zero count and excitation voltage is full count |
| Accuracy: | ±0.5% (0.87 ohm) |

Strain Gauge:

| Range: | 0 to 50 mVDC |
|---|---|
| Accuracy: | ±0.2% full scale |
| Digital Scaling: | 0 mVDC - zero count 50 mVDC - full count |
| Positive Excitation | +20 VDC max. |
| Negative Excitation | −20 VDC max. |

Thermocouple:

| Type: | Chromel/Alumel |
|---|---|
| Range: | 0-35 mVDC |

Note:
Cold junction compensation should be provided internal to the IAC-1239.

Accuracy and digital scaling should be user defined.
Series Discrete:

| Range: | 0 to 32 VDC |
|---|---|
| State 1 | Defined as any voltage greater than +7.0 volts |
| State 0 | Defined as any voltage less than +3.0 volts |
| | An open-circuit input is also defines as State 0. |

Shunt Diode:

| Range: | 0 to 32 VDC |
|---|---|
| State 1 | Defined as any voltage greater than +7.0 volts |
| State 0 | Defined as any voltage less than +3.0 volts |
| | An open-circuit input is defined as State 1 |

Discrete Output

Twenty-four general purpose discrete outputs are provided. Each output is an open collector output capable of sinking 100 mAmps. These discrete outputs are capable of interfacing with the IAC Cockpit Control Head or sinking current to illuminate caution and warning lights. Three outputs are provided that are capable of sinking up to two amps of current.

Reference Outputs

The IAC-1239 system 10 provides eight separate reference outputs or "Excitation Power" outputs to be used by various sensors. The reference output is short circuit protected. The reference output has the following capability:

| Source: | IAC-1239 |
|---|---|
| Amplitude | +5 V ±5% |
| Load Capacity | 200 Milliamps |

The IAC-1239 system 10 acquires and processes tracker data from up to two of IAC's intelligent Blade Tracker (iBT) and one of the US Army's Universal Tracking Device (UTD). The IAC-1239 system 10 processes rotor blade height and lead lag data. The IAC-1239 system 10 is capable of acquiring and processing data from two blade trackers simultaneously.

Controller Area Network (CAN)

The IAC-1239 system 10 provides a single CAN 2.0B bus interface. The Controller Area Network (CAN) specification defines the Data Link Layer, ISO 11898 defines the Physical Layer. The CAN interface is an asynchronous transmission scheme controlled by start and stop bits at the beginning and end of each character.

Universal Serial Bus (USB)

The IAC-1239 system 10 provides four USB 1.1 data ports. The USB data ports supports connection to an external USB memory drive, memory stick or USB host to host cable.

Ethernet

The IAC-1239 provides four (4) standard 10/100/1000BASE-T Ethernet connections. Three Ethernet connections are used to interface external aircraft systems that provide aircraft data, the third is used on the ground to download data, load software updates, and test the IAC-1239 system 10.

MIL-STD-1553

The IAC-1239 system 10 is equipped with up to four (4) dual-redundant MIL-STD-1553 interfaces capable of operating as bus monitors and remote terminals concurrently. The interfaces are produced in accordance with MIL-STD-1553, for example. The IAC-1239 system 10 responds to the 1553 bus controller as a remote terminal without interrupting bus-monitoring functions.

RS-2321485

The IAC-1239 system 10 provides four full duplex serial ports. As a minimum two of these ports support EIA RS-232 format with a baud rate of 9600 to 115 k baud. Two of these serial ports support EIA RS-4221RS-485. One of these ports include the transmitted and received bit clock in compliance with the RS-422A interface for Solid State flight data recorders as specified in ARINC 747-2.

The IAC-1239 system 10 provides one IEEE 1394 fire wire interface capable of 400 MHz operation.

The IAC-1239 system 10 includes ARINC-429 interfaces that are IAW EIA-ARINC-429. Four (4) ARINC-429 receivers are provided, each factory configurable for either low speed (12.5 kHz) or high speed (100 kHz) data rate inputs. The following are modifiable through configuration:

The ARINC labels to be acquired stored and recorded.

Record the entire label, including the Source Destination Index (SDI), Sign Status Matrix (SSM) and Parity bit as required.

Record only needed portions of the label.

The acquisition and storage rate for each label.

The memory location each label is stored.

The IAC-1239 system 10 has at least two (2) ARINC-429 transmitters. The transmitters are factory configurable for either low speed (12.5 kHz) or high speed (100 kHz) data rate output. The following are modifiable through configuration:

specify the ARINC labels to be transmitted.

specify the transmit rate of the labels.

The IAC-1239 system 10 is able to operate and meet its performance requirements when furnished +28 V DC electrical power provided by the aircraft in accordance with MIL-STD-704. The characteristics of this electrical power include normal, abnormal and emergency steady state and transient conditions, and any additional requirements specified herein. The equipment is not damaged or will not produce a damaging or unsafe condition to the aircraft or other aircraft equipment upon receipt of the abnormal or emergency power inputs. The equipment automatically recovers full-specified performance without human intervention when the electrical power characteristics are restored to the normal limits. Transparency to power interruptions is no less than 50 msec. Any power interrupt does not cause any long term loss in the HUMS functions once power is recovered.

Electrical Power Output

The IAC-1239 system 10 is capable of providing DC power to external sensors and system. The systems power has the following characteristics:

| Voltage | Current | Accuracy |
| --- | --- | --- |
| +24 VDC | 500 mAmps | ±5% |
| +12 VDC | 2 Amps | ±5% |
| +5 VDC | 1 Amp | ±5% |

Inertial Measurement

The IAC-1239 system 10 provides the ability to add an expansion card that contains a MEMS sensors and Global Positioning System (GPS). Software processes raw sensor data into location, rate and attitude information necessary for FOQA and HOMP.

Software Overview

Figure 2:
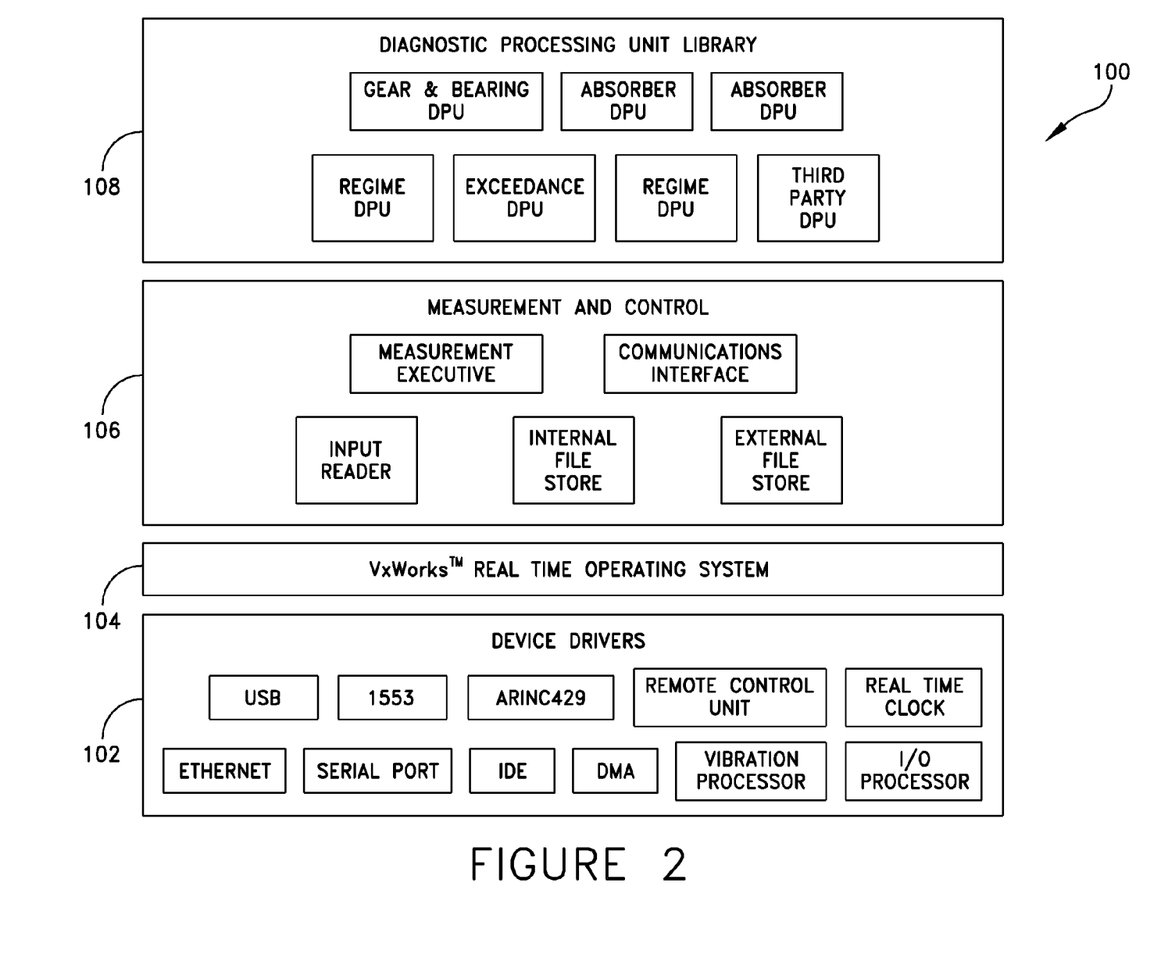
FIG. 2 is an on-board software block diagram in conformance with an exemplary embodiment of the invention.

FIG. 2 provides a simplified block diagram of the on board software 100. The software is modular. Major functional blocks include device drivers 102, the operating system 104, measurement and control 106 and Diagnostic Processing Unit (DPU) Library 108. DPUs provide specialized diagnostic processing and may utilize all raw and semi-processed data collected by the system 10. DPUs have access to all raw measured data. The IAC-1239 system 10 supports On Board Software v4.0 with only modifications to device driver functions. All acquisition, processing, communication and storage methods shall be supported.

Software Characteristics

All IAC-1239 OBS software is certifiable to DO-178B Level D. The IAC-1239 software architecture permits changes to be made to the operating software. All software includes methods for updating, troubleshooting and maintaining configuration control. The software design incorporates procedures and/or design features that preclude the possibility of undesired or hazardous function execution.

Digital Signal Processor (DSP) Function Processor

The IAC-1239 system 10 supports a DSP function processor implemented in a XILINX FPGA. The DSP function processor implements DSP functions that are currently processed by the system Pentium compatible processor that consume a significant portion of the Pentium compatible processor bandwidth. The DSP Function Processor is implemented so that math library functions currently written in 'C' code can be replaced with DSP Function Processor calls. The DSP Function Processor is implemented so that all parameters passed to the current 'C' math library are maintained. This facilitates the gradual FPGA implementation of processor intensive math library functions.

The DSP Function Processor memory is multi-ported and mapped to the Pentium compatible and embedded FPGA processors with the objective of eliminating time and processor bandwidth consuming memory to memory transfers. The objective of the DSP Function Processor implementation is to increase process throughput by 1,000% over the current IAC-1209 software/hardware implementation.

The IAC-1239 system 10 boots directly into VxWorks 104 without using a significant Basic Input Output System (BIOS). Adequate self test shall be built into the VxWorks 104 boot process to insure that the basic memory and processing hardware is functioning.

Self Test and Calibration

The IAC-1239 system 10 has a full built in test capability that exercises all acquisition, processing and communication functions. The system 10 is capable of self calibration by comparing each acquisition channel to a high accuracy and stable master voltage reference. The accuracy of the master voltage reference is compared against a secondary reference. The master reference voltage is buffered and externally available to allow traceability to the National Bureau of Standards.

Parameter Buffer Processor

The IAC-1239 system 10 implements a parameter buffer processor. The parameter buffer collects data from analog, discrete and digital parameters from the various system data buses and stores the data in a shared memory buffer. The frame buffer reduces the workload associated with software based parameter buffer management and data movement.

The parameter buffer processor is implemented in FPGA logic and utilizes shared memory so that the FPGA, Geode Processor and future PowerPC processors have access to the parameter buffer data.

Inertial Measurement System

Using a combination of internal inertial measurement system and/or external aircraft data the IAC-1239 system 10 calculates the parameters such as drift angle, latitude, longitude, pitch attitude, Time, wind angle, wind speed, lateral acceleration, long acceleration, vertical speed and yaw rate. The parameters are calculated from the GPS Position (X,Y,Z), Velocity (X,Y,Z), Acceleration (X,Y,Z), Roll, Pitch, Heading, 3-Axis angular rate and Coordinated Universal Time (UTC) data. The IAC-1239 has the ability to calibrate the installation to accommodate IAC-1239 system 10 installation positions.

Partitioned PowerPC Processors

The IAC-1239 system 10 provides hardware and software support for the processors embedded in the FPGA. In the illustrated exemplary embodiment, the processors are not utilized, however in other embodiments the processors are used to host the core software currently executing on the Pentium compatible processor, host specific functions certified to higher level DO-178B certification levels, or host other software such as the Future Combat System Platform Soldier Mission Readiness System (PSMRS).

The IAC-1239 system 10 improves system processing capability by 1000% when compared with the IAC-1209 system. The speedup is achieved by implementing the FPGA DSP function processor, analog parameter buffer processor and through the utilization of faster processors the PCI bus and reducing memory transfers.

Bus Throughput

The core system processor bus is a 32 bit wide PCI bus operating at 33 MHz. Chip-to-chip communication is done using the appropriate high speed serial interface to reduce communication on the PCI bus and support circuitry.

Technology insertions are supported at the firmware, OBS software and system setup layers.

The IAC-1239 FPGA firmware is updatable through either a software or JTAG interface. The software based updates are performed by inserting a new compact flash card or via software upload through one of the serial communication ports. The VMEP-ECA processor card is a reconfigurable computer allowing high speed processing algorithms, data management and buffering and digital I/O to be added or modified through firmware upgrades.

Other upgrades can include updating the Ethernet ports to Gigabit Ethernet, updating DSP functions to higher speed or novel configurations, updating the parameter buffer processor to allow input data filtering.

The functionality of the iMDS Database setup tool 24 is established. New functions required by the IAC-1239 system 10 such as the inertial system or additional analog/discrete channels are supported.

Figure 3:
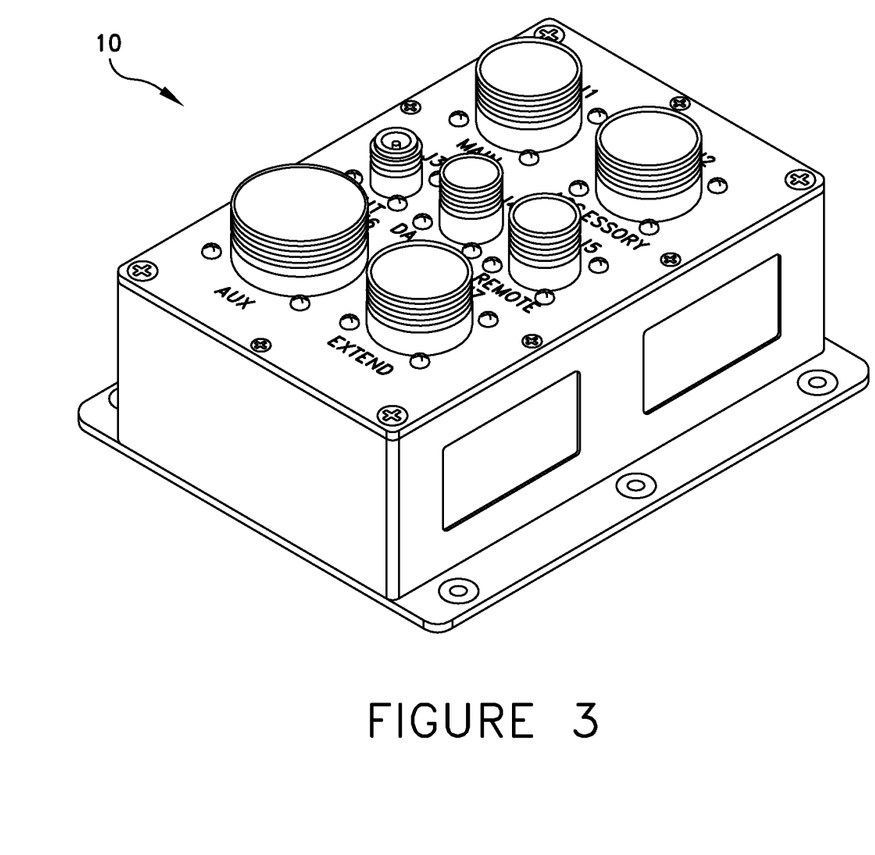
FIG. 3 is a IAC-1239 Three Card Stack Configuration arrangement.

Physical characteristics of all IAC-1239 system 10 equipment are detailed as follows: FIG. 3 provides a pictorial of the IAC-1239 10.

In an exemplary embodiment, the IAC-1239 system 10 weight is less than 5 lbs. The system is designed to minimize weight.

Figure 4:
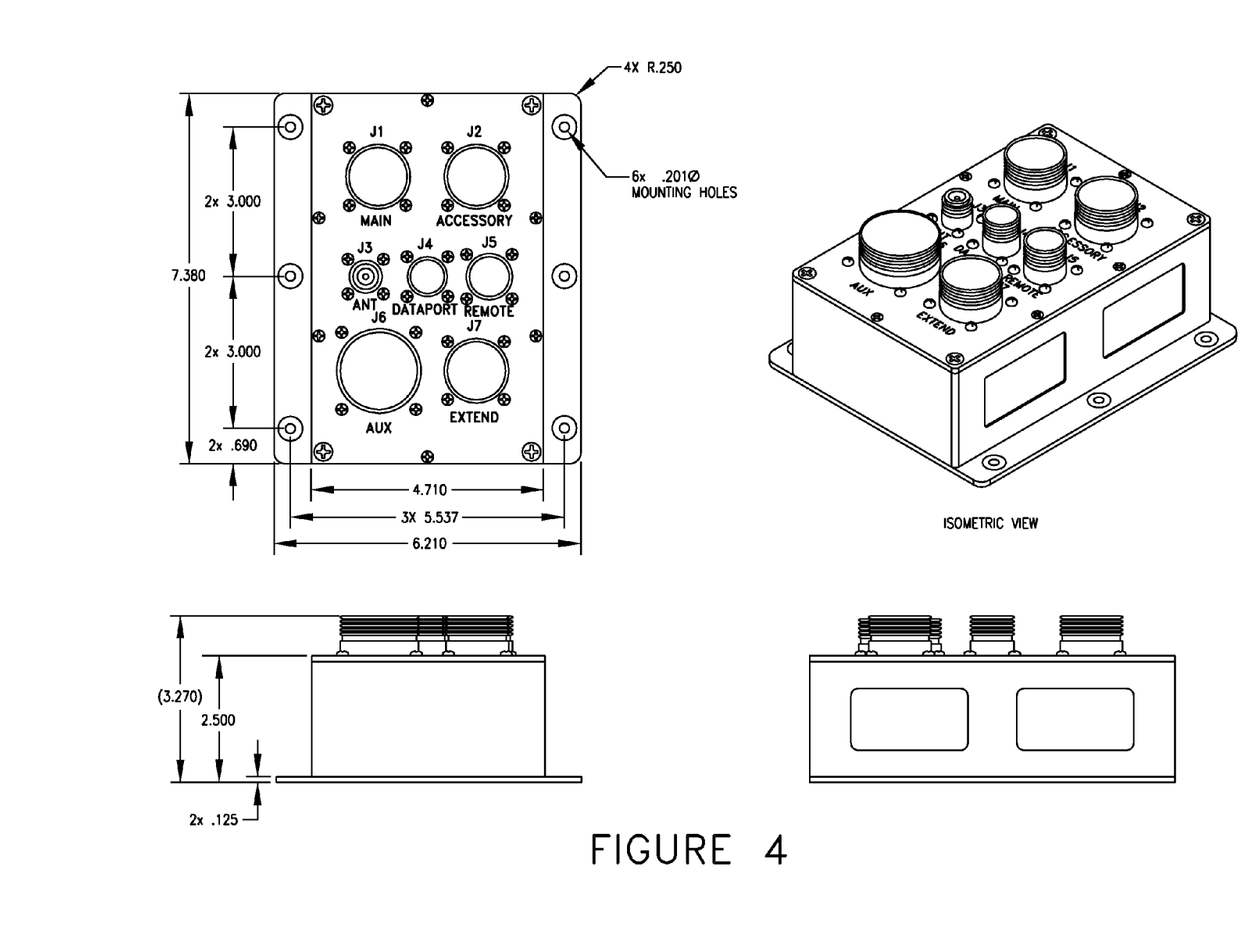
FIG. 4 is a IAC-1239 system dimension and outline drawing.

The IAC-1239 system 10 conform to the dimensions as shown in FIG. 4. The mounting provisions are compatible with the IAC-1209 system 10 product allowing the IAC-1239 to be a form fit and function replacement for the IAC-1209.

Figure 5:
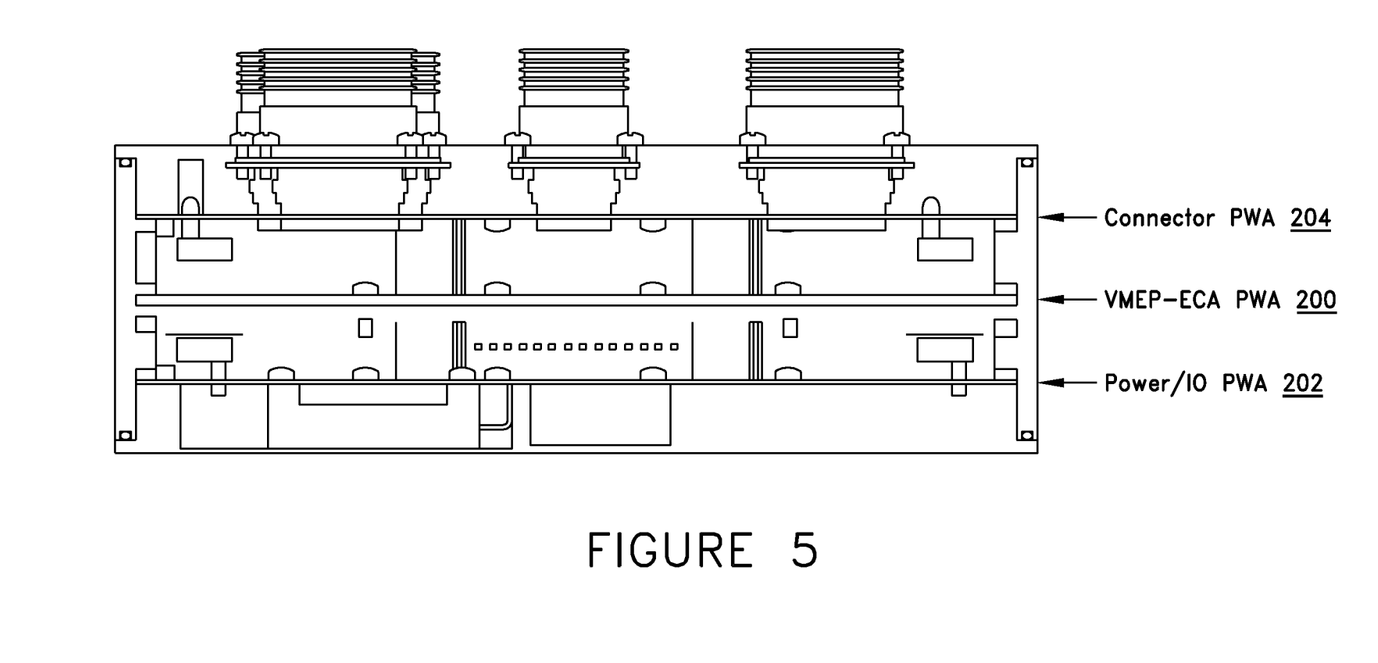
FIG. 5 is a unit construction drawing of FIG. 4.

FIG. 5 provides a view of the IAC-1239 unit 10 construction. The unit consists of four standard cards in the basic configuration including the:

VMEP-ECA Circuit Card 200
Power Supply/10 Circuit Card 202
Connector Circuit Card 204
Inertial Measurement Expansion Card (not shown)

The VMEP-ECA circuit card 200 is mounted at the middle of the chassis. This card 200 contains the acquisition and processing electronics. The processor and other power generating components are mounted on the bottom of the circuit card 200 and are thermally connected to heat sinks that are integral to the chassis, The VMEP ECA circuit card 200 contains high density stacking connectors to connector I/O and power to and from the power supply and subsequently to the Connector Circuit card 204. The VMEP-ECA circuit card 200 contains one connector for the IDE Compact Flash Interface Card.

The Power Supply Circuit Card 202 provides power for the IAC-1239 system 10. It is a high efficiency design that converts +28VDC input power into regulated power for the electronics. The Power Supply Circuit Card 202 contains input protection and filtering to meet the MIL-STD-704A/D requirements. A power hold capacitor is part of the power supply circuit card 202 allowing the unit 10 to hold up power for a minimum of 50 msec.

The connector card provides IAC-1209 compatible connectors to interface to the aircraft or other system. The MIL-STD-38999 connectors are solder-pin style providing a direct connection to the circuit card. The connector card 204 routes I/O from the stacking connectors to the MIL-STD-38999 connectors. The IAC-1209 pin outs are retained.

The IAC-1239 system 10 is designed such that it will not require aircraft forced cooling air. The IAC-1239 LRU semiconductor component operating temperatures does not exceed the derated maximum when operated under the environmental conditions identified in this specification. The chassis and electronics are designed so that the heat generating components utilize the chassis as a heat sink. Electronics are designed to minimize power dissipation.

Figure 6:
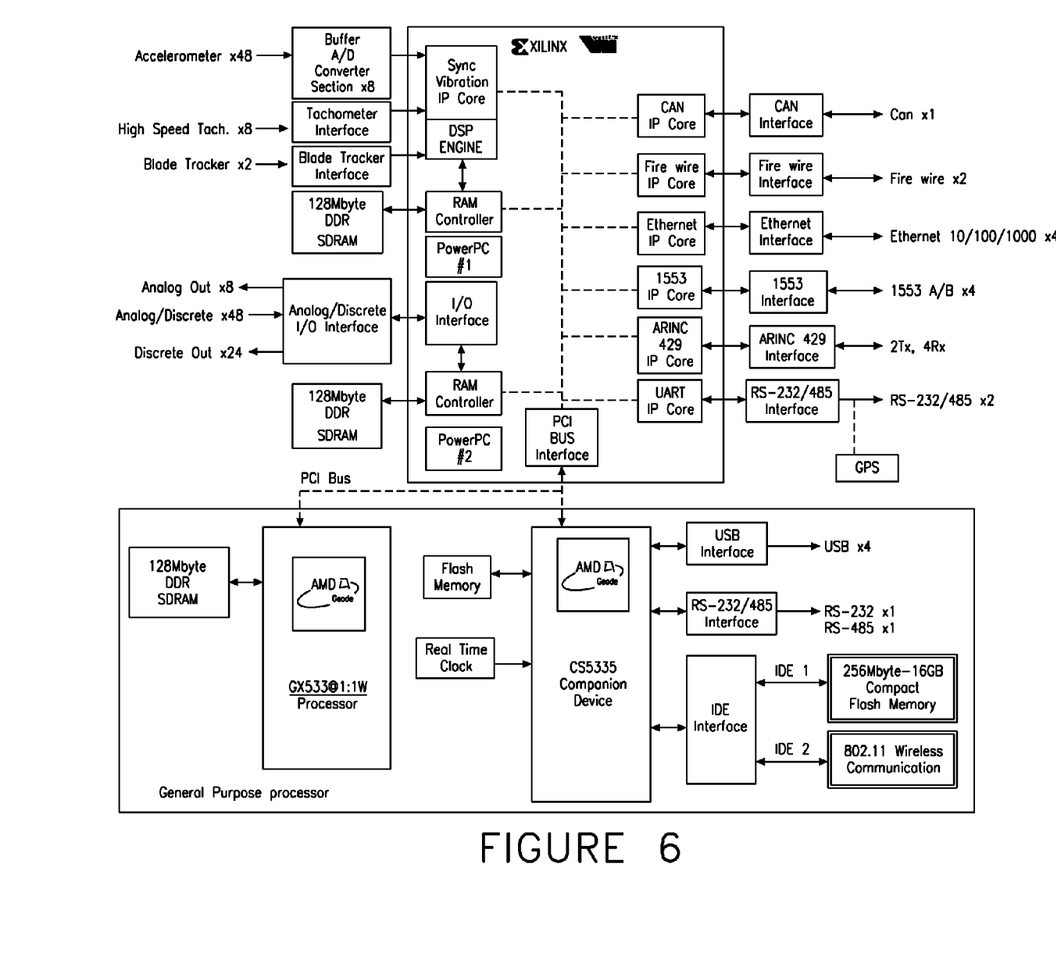
FIG. 6 is a VMEP-ECA Circuit Card Block Diagram of the IAC-1239 system.

The IAC-1239 is a high density acquisition, processing and storage device for aircraft Health and Usage Monitoring. It relies on advanced Field Programmable Gate Array (FPGA) technology to dramatically increase processing speed and acquisition channel counts while reducing system size. The electrical characteristics are detailed as follows:

The VMEP-ECA Circuit Card 200 contains the main acquisition and processing circuitry. It provides interconnection through stacking connectors.

Figure 7:
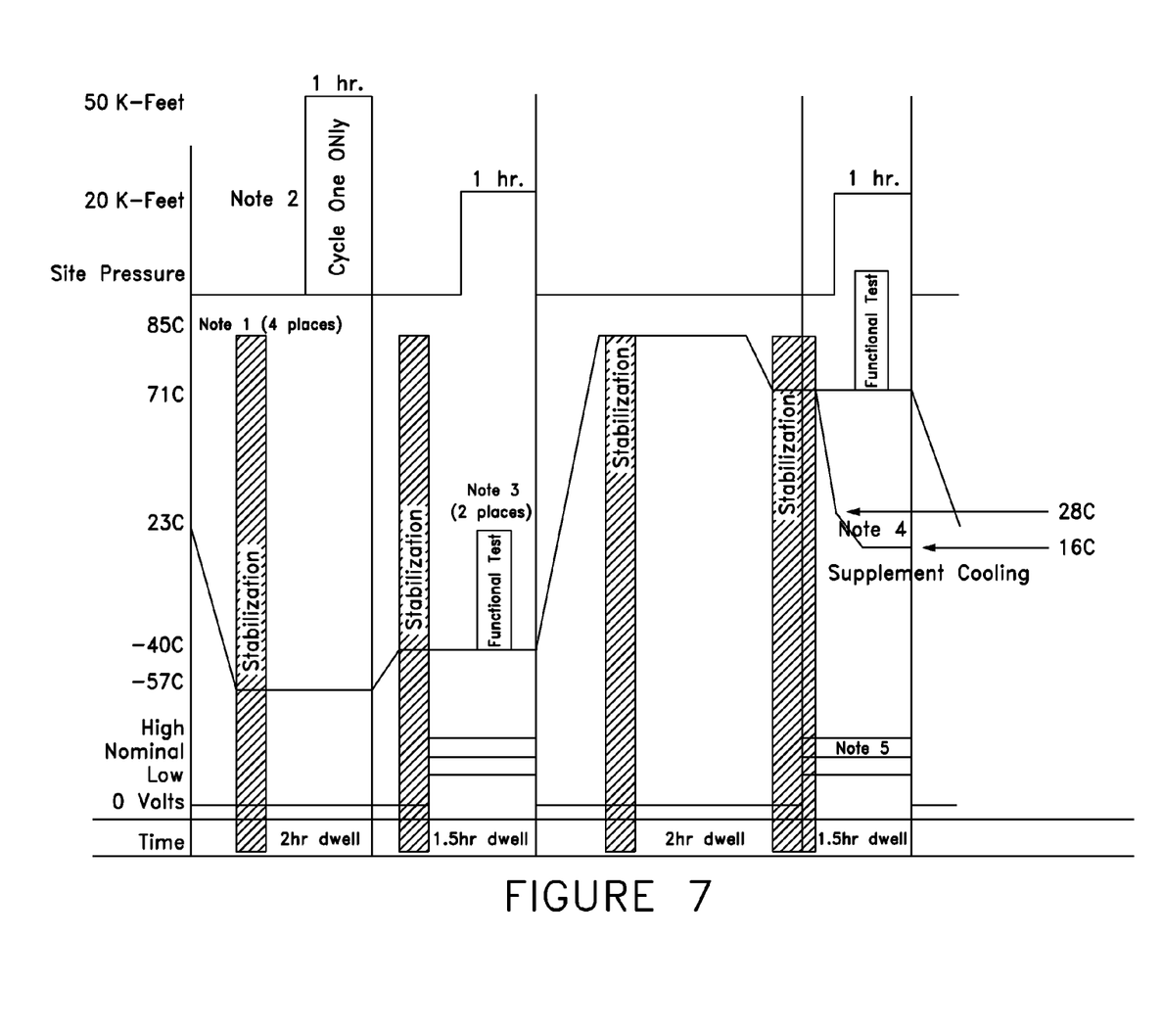
FIG. 7 is an exemplary temperature and altitude testing profile of the IAC-1239 system.

FIG. 6 provides a block diagram of the VMEP-ECA Circuit Card 200. FIG. 7 is an exemplary temperature and altitude testing profile of the IAC-1239 system 10.

High Speed Sensor Processor (HSSP)

The High Speed Processor is based on a high density FPGA. The FPGA contains interfaces to the accelerometer A/D converter section, tachometers, blade trackers and the analog/discrete I/O. The high speed sensor processor interfaces to the General Purpose Processor using a 32 bit 33 MHz PCI bus.

The function of the HSSP is to manage the hardware interfaces to the sensors and digital I/O and provide hardware based processing such as the DSP Function Processor and Parameter Buffer processor. The objective of the HSSP is to dramatically improve the DSP processing performance and reduce movement and transfer times for sampled sensor data and digital I/O.

The HSSP contain two 128 Mbytes of RAM blocks. The RAM controller is multi-ported allowing the FPGA processors, and the Pentium compatible processor and sensor interface to read and write from the RAM. The memory interface and board layout is designed so that higher density memory chips can be used with circuit board layout changes.

When possible, the sensor and Digital interface data is directly written to the HSSP memory without processor intervention. The FPGA are suitably sized for system growth with firmware updates. The system 10 also provides the possibility to update the HSSP FPGA code either through a JTAG interface or software load.

Configurable Digital Input Output (CDIO)

The FPGA implements various digital data interfaces based on Intellectual Property (IP) Cores. The object of an FPGA-IP Core approach is to allow the IAC-1239 system 10 to be adaptable to a variety of applications. The CDIO is capable of providing the interfaces such as, for example, CAN, Ethernet, MIL-STD-1553, RS-232/485, Fire Wire and ARINC 429.

All required interface chips are included on the VMEP-ECA circuit card 200. While in certain embodiments it is desirable that all IP Cores are included in the CDIO, it is acceptable that there are different versions of the FPGA firmware that contain selected IP Cores. All of the interfaces must be supported without hardware changes. It shall be possible to update the HSSP FPGA code either through a JTAG interface or software load.

The General Purpose Processor is compatible with the IAC-1209 On Board Software (OBS). The processor includes 266 Mbytes of DRAM and a companion I/O chip that provides the 4 USB 1.1 ports, 2 IDE compact flash ports, 2 RS-232/422/485 compatible ports and a real time clock. The General Purpose Processor is designed to be low power.

The VMEP-ECA circuit card 200 provides a connector that provides one IDE interface to a circuit card that contains one compact flash card for program and data storage. The compact flash card is securely mounted to the circuit card 200 so that it will not disconnect in a high vibration environment.

The power supply is based on the IAC-1209 power supply and power input circuitry. The power supply card includes input power filtering and protection circuitry and the power hold up capacitor. The power supply output voltages are modified to include those power supply voltages necessary for a PCI interface. The VMEP-ECA circuit card 200 accepts PCI voltage levels and converts them to those voltages necessary for operation on the card.

The power supply has an efficiency of 90% or higher. The thermal generating components uses the chassis wall as a heat sink.

The connector card supports all current IAC-1209 connector types and pinouts. It is designed so that the IAC-1239 system 10 is used as a replacement for the IAC-1209. The MIL-STD-1553 bus interface connect through MIL-STD-38999 connectors rather than the IAC-1209 triax connectors. A MIL-STD-38999 RF connector is provided to interface to an external antenna for GPS reception and 802.11 wireless communication. An additional high density MIL-STD-38999 connector is used for additional I/O not available on the IAC-1209 system.

The IAC-1239 system 10 includes Fault Detection and Fault Isolation capability. The Fault Detection (FD) for the IAC-1239 system 10 comprises an automated Built-in-test (BIT) method. Automated BIT method is defined as capability currently being detected and annunciated through the aircraft CMS. The integrated electronic solution to BIT on the IAC-1239 system 10 achieve a FD capability of 95%.

The Fault Isolation (FI) for the IAC-1239 system 10 has Built-in-Test (BIT) capability that meets a minimum of 90% of all BIT detected failures. The FI capability of all electronic/automated BIT detected faults has a minimum of 98% utilizing aircraft BIT capability and Integrated Electronic Technical Maintenance System (IETMS). Isolation to components below the unit repairable level is not required. No fault detection or fault isolation tasks for a single LRU shall take more than 30 minutes.

The False Alarm (FA) Rate for the IAC-1239 system 10 shall be 3% or less for all BIT detectable faults. A false alarm is defined as a diagnostic test indication which results in a maintenance action wherein non-failed items are removed and replaced or causes a partial or full equipment shutdown maintenance action which does not result in a subsequent item replacement or termination of the mission which does not result in a subsequent maintenance action.

The IAC-1239 LRU is capable of storing built-in test (BIT), built-in test equipment (BITE) and exceedances, and operational information for downloading into the Maintenance Support Device (MSD), or like equipments, for troubleshooting the aircraft and its systems.

The IAC-1239 system 10 has the ability to report faults of itself, and the other components involved in the IAC-1239 function. The Start Up BIT (SBIT) of the system 10 shall check all of the internal components in the main 1AC-1239 processor, whenever a cold start is executed. SBIT shall report any faults to the user, record them, and cease startup, if necessary. The IAC-1239 system 10 has a Periodic BIT (PBIT) that runs continuously after start up, and monitors the health of the processing module, and all IAC-1239 sensors.

The BIT architecture of the system 10 allows for an Initiated BIT (IBIT) to be run that will check every part (processors, sensors) and report them as the IAC-1239 system 10 status before flight. BIT status will be reported via the CAAS1553 system bus and can be downloaded for further analysis.

Environment Qualifications/Conditions

The IAC-1239 system 10 operates in accordance with and is subjected to the qualification tests for temperature, altitude, crash hazard shock, vibration, explosive atmosphere, low pressure, high temperature storage, low temperature storage, temperature shock, humidity, rain, fungus, salt fog, dust, sand, functional shock, bench handling shock, gunfire vibration.

Vibration tests may be intermittent to avoid unrealistic exposure. For example, vibration may be applied in periods of 2 seconds on, then 8 seconds off, as long as the accumulated on time is one hour.

Electromagnetic Environmental Effects ($E^3$)

The IAC-1239 system 10 also meets Aircraft Electromagnetic Environment (EME). In addition, the equipment meets the Electromagnetic Interference (EMI) requirements. The equipment, when installed in the aircraft, also meets the following requirements:

The Electromagnetic Compatibility (EMC) requirements of Paragraph 3.3 of ADS-37A-PRF The Electromagnetic Vulnerability (EMV) requirements of Paragraph 3.4 of ADS-37A-PRF The Lightning Protection requirements of Paragraph 3.8 of ADS-37A-PRF. Lightning test levels are from Section 22, RTCA/DO-160, Lighting, Indirect Effects.

The Static Electricity requirements of Paragraph 3.7 of ADS-37A-PRF

Aircraft discharge requirement of ADS-37A-PRP, paragraph 3.7.1

ESD-Personnel Handling shall meet MIL-STD-1686, HBM class 3

The 2.5 milli-ohm bonding requirement of Paragraph 3.10 of ADS-37A-PRF

The IAC-1239 system 10 demonstrates conformance with MIL-STD-461E, ADS-37 and RTCA-DO-160 by being subjected to the tests listed in the following subsections.

The system 10 also meets other testing requirements, such as emissions tests, conducted emissions, radiated emissions, conducted susceptibility tests for power leads and structure current, conducted susceptibility for bulk cable injection, conducted susceptibility for bulk cable injection impulse excitation, damped sinusoidal transients, radiated susceptibility for magnetic fields, radiated susceptibility for electric fields, magnetic effects tests, power input tests, such as for Voltage, Ripple, Momentary Power interruptions, Normal Surge Voltage and Engine Starting under Voltage Operation and foreign object protection.

The IAC-1239 system 10 bonding provisions shall provide continuity not exceed 2.5 milliohms between the equipment's external mechanical interface and aircraft ground. The IAC-1239 bonding is designed in accordance with MIL-B-5087. The IAC-1239 system 10 utilizes a grounding system so as to prevent ground loops and common ground for signal circuits for EMI control, and to protect personnel from electrical hazards using MIL-B-5087 as a guide.

The IAC-1239 system 10 also incorporates safety-grounding provisions to prevent shock hazard. The safety ground is in accordance with MIL-B-5087, Class H (100 milli-ohms).

A safety ground pin is provided at each multi-pin I/O connector. The equipment provides a 2.5 milli-ohm bonding path to the aircraft mounting provisions. This requirement may be achieved using bonding straps and/or faying surface contact.

Where dissimilar metals are used in contact with each other, protection against electrolytic corrosion is applied in accordance with Mil-Std-889. Finishes are in accordance with Mil-STD-7179. For exterior surfaces of the IAC-1239 system 10 are finished using MIL-P-23377 or MIL-PRF-85582 primer and coated in accordance with MIL-C-46168 or MIL-C-53039. The exterior finish color shall be per Fed-Std-595, Shade No. 37038, Black.

The IAC-1239 system 10 incorporates D38999 Series III connectors in accordance with MIL-DTL-38999. Connectors of similar size shall have different keying to prevent the wrong mating connector from being accidentally connected.

An Electrostatic Discharge (ESD) label is affixed to all printed circuit cards and electronic/electrical subassemblies that contain ESD parts. The labels are located as to be visible with the subject part normally installed. The IAC-1239 system 10 shall have an ESD warning label affixed.

The IAC-1239 system 10 is designed for the interchangeability requirements in accordance with MIL-HDBK-454, Requirement 7, paragraph 4.1. The IAC-1239 system 10 is configured to be interchangeable such that the same part number in a given aircraft configuration can be installed in either "left or right" position without adjustment or modification. All cards or subassemblies that contain electrical/electronic components have integral connectors that plug into mating connectors mounted in the chassis assembly. The cards are keyed to prevent the wrong card from being put into the wrong card slot.

The IAC-1239 system 10 contains no variable resistors or any electronic components that requires routine adjustment. The equipment contains no select-at-test components. Modules and connectors or mounting methods are keyed to prevent the insertion of a connector or subassembly into an improper location within or on the equipment.

Environmental, Safety and Occupational Health design requirements contained in MIL-STD-882 and DOD 5000.2 are applied to ensure that adequate Environmental, Safety and Occupational Health provisions are included in the design, maintenance and operational phases of the equipment. The equipment promotes the safety of the aircraft, operators, maintainers, support personnel, and environment at all levels consistent with the methodology and processes of MIL-STD-882. Minimum hazard risk is sought in applications of new design approaches, materials, production operations and testing techniques. Uncontrolled critical or catastrophic hazards are not be introduced into newly designed systems. Failure of the IAC-1239 equipment does not cause critical or catastrophic hazards to personnel or equipment. Hazards to personnel, equipment, property, and the environment are avoided during design implementation and test/demonstrations of the system.

The IAC-1239 system 10 operates throughout worldwide extremes of climate, weather, and other environmental factors and may use MIL-HDBK-310 and AR 70-38 as guides.

Markings, labels and use of colors for the IAC-1239 system 10 are consistent with MIL-STD-1472. The equipment is designed so that troubleshooting and personnel attired in full MOPP gear can perform removal of the unit from the aircraft. Use of gloved hand and the ability to mate and de-mate connectors sequentially is permissible for the satisfaction of this requirement.

The reliability of the IAC-1239 system 10 is equal to or greater than a Mean Time Between Failure (MTBF) of 5000 hours/LRU.

The Mean Time To Repair (MTTR) of each IAC-1239 LRU is equal to or less than 0.5 hours at the Aviation Unit Maintenance AVUM (on-aircraft or organizational) level. The calculation excludes fault detection and fault isolation time.

What is claimed is:

1. A system to monitor vehicle and aircraft equipment, comprising:
   a chassis, defining an interior compartment;
   an arrangement configured to accept input data of at least one of a vehicle and aircraft parameter, the arrangement configured to be placed within at least one of a vehicle and aircraft;
   a processing and acquisition system containing a high density Field Programmable Gate Array onboard the aircraft, the high density Field Programmable Gate Array comprising a plurality of reconfigurable processors configured to provide for partitioning of multiple levels of certified software;
   a power supply arrangement connected to arrangement configured to accept and record input data;
   an accelerometer unit;
   a tachometer unit;
   a plurality of blade trackers; and
   an input/output unit;
   wherein the high density FPGA interfaces with each of the accelerometer unit, the tachometer unit, the plurality of blade trackers; and the input/output unit; and
   wherein the system comprises a health and usage monitoring system (HUMS).

2. The system according to claim 1, further comprising:
   an arrangement to download the input data to a flight data monitoring program.

3. The system according to claim 2, wherein the flight data monitoring program is configured to access, analyze and act on data of the at least one aircraft parameter.

4. The system according to claim 1, further comprising:
   an arrangement to download the engine data to an engine monitoring program.

5. The system according to claim 4, wherein the engine data monitoring program is configured to access, analyze and act on data of the at least one engine parameter.

6. The system according to claim 1, further comprising:
   an arrangement to download the input data to a vehicle monitoring program.

7. he system according to claim 6, wherein the engine data monitoring program is configured to access, analyze and act on data of the at least one vehicle parameter.

8. The system according to claim 1, further comprising:
   at least one vibration monitoring system connected to at least one of a mechanical component.

9. The system according to claim 1, further comprising:
   at least one aircraft and vehicle SAE standard military and / or commercial buss digital data.

10. The system according to claim 9, wherein the system is configured to calculate at least one of engine operating regime, engine component performance and engine power assurance.

11. The system according to claim 1, wherein the system is configured with device drivers and software to interface with a FPGA based Digital Signal Processor.

12. The system according to claim 11, wherein the system is configured to process at least one of Fast Fourier Transforms, Discrete Fourier Transforms, Re-sampling time samples and Synchronous Order Domain Transforms.

13. The system according to claim 1, further comprising:
an integral crash survivable cockpit voice and flight data recorder.

14. The system according to claim 1, wherein the system includes an integral inertial measurement system consisting of Micro Electro Mechanical (MEM) acceleration, rate and magnetometer sensors and a Global Positioning System (GPS).

15. The system according to claim 14, wherein the system is configured to measure at least one of a vehicle and aircraft's location, speed and attitude information.

16. The system according to claim 15, wherein the system is configured to calculate one of location, speed and attitude information when GPS data is unavailable.

17. The system according to claim 14, wherein the system is configured to measure and record vehicle operating condition or aircraft flight regime.

18. The system according to claim 1, wherein the system is configured to use aircraft flight regimes for the purposes of determining a components useful remaining life.

19. The system according to claim 1, wherein the system is configured to use engine operation regimes to determine engine components useful remaining life.

20. The system according to claim 1, wherein system input/output and processing are configured to be modified through reprogramming of the FPGA hardware functions through software updates.

21. The system according to claim 20, wherein FPGA modifications can isolate input/output and processing functions for the purposes higher level aircraft certification.

22. The system according to claim 1, further comprising:
an arrangement wherein the stored raw and processed data is transmitted to a ground station using wireless communication.

23. The system according to claim 22, wherein an operating condition of the aircraft and engine components are determined so that the store raw and processed data is only transmitted when the aircraft is on the ground.

24. The system according to claim 1, wherein the system is configured to withstand at least one of temperature, altitude, crash hazard shock, vibration, explosive atmosphere, low pressure, high temperature storage, low temperature storage, temperature shock, humidity, rain, fungus, salt fog, dust, sand, functional shock, bench handling shock and gunfire vibration.

25. The system according to claim 17, wherein the circuit card is configured to perform at least one of Rotor Track and Balance, Drive Train Vibration Monitoring, Flight Operations Quality Assurance (FOQA), Helicopter Operational Monitoring Program (HOMP), Engine Health and Usage Monitoring, Engine Performance Assessment, Engine Power Assurance, Exceedance Monitoring and Regime Recognition.

26. The system according to claim 1, further comprising:
at least one Ethernet connection used to interface external aircraft systems.

27. A system to monitor an aircraft, comprising:
a chassis with an interior arrangement, the interior arrangement comprising at least one processor and acquisition card, Power Supply/IO Circuit Card, Card, and a inertial measurement card;
a high density Field Programmable Gate Array onboard the aircraft that is coupled to one or more components of the chassis, the high density Field Programmable Gate Array comprising a plurality of reconfigurable processors configured to provide for partitioning of multiple levels of certified software, wherein the system comprises a health and usage monitoring system (HUMS);
an accelerometer unit;
a tachometer unit;
a plurality of blade trackers; and
an input/output unit;
wherein the high density FPGA interfaces with each of the accelerometer unit, the tachometer unit, the plurality of blade trackers; and the input/output unit.

28. The system according to claim 27, wherein the system has a fault isolation system arrangement configured to determine correct measurement and operation of one or more external sensors.

29. The system according to claim 28, wherein the fault isolation system arrangement has a built in test arrangement.

30. The system according to claim 28, wherein the interior arrangement is configured to monitor vibrations on the aircraft.

31. The system according to claim 28, further comprising:
a crash survivable cockpit voice and flight data recorder.

32. The system according to claim 28, wherein the system is configured to perform at least one of Engine Performance Monitoring, Engine Power Assurance and Engine Usage Monitoring.

33. The system according to claim 28, wherein the circuit card is configured to perform at track at least one of Rotor Track and Balance, Drive Train Vibration Monitoring, Helicopter Operational Monitoring Program (HOMP), Engine Health and Usage Monitoring, Exceedance Monitoring and Regime Recognition.

* * * * *